United States Patent

[11] 3,533,413

| [72] | Inventor | Erwin L. Schenk<br>Moline, Illinois |
|---|---|---|
| [21] | Appl. No. | 646,698 |
| [22] | Filed | June 16, 1967 |
| [45] | Patented | Oct. 13, 1970 |
| [73] | Assignee | J.I. Case Company<br>Racine, Wisconsin<br>a corporation of Wisconsin |

[54] CLEANING UNIT FOR COMBINE
1 Claim, 4 Drawing Figs.

[52] U.S. Cl. ..................................................... 130/27
[51] Int. Cl. ..................................................... A01f 12/48
[50] Field of Search .......................................... 130/27, 27.32; 230/125B

[56] References Cited

UNITED STATES PATENTS

| 2,199,488 | 5/1940 | Flemins | 130/27 |
| 2,395,163 | 2/1946 | Carroll | 130/27 |
| 3,109,433 | 11/1963 | Claas | 130/27 |
| 3,209,989 | 10/1965 | Eck | 230/125 |
| 3,212,735 | 10/1965 | Laing | 230/125 |

Primary Examiner—Antonio F. Guida
Attorney—Settle, Bathchelder & Oltman

ABSTRACT: A harvesting unit or combine including means for separating the harvested crop from the remainder of the harvested material. The separating means includes a primary separating unit for segregating the grain from the straw and a secondary separating or cleaning unit which includes a cross flow fan for providing a uniform distribution of air in the cleaning unit.

Patented Oct. 13, 1970

INVENTOR.
ERWIN L. SCHENK.
BY
WILSON, SETTLE, BATCHELDER &
CRAIG.
ATT'YS.

INVENTOR.
ERWIN L. SCHENK.
BY
WILSON, SETTLE, BATCHELDER &
CRAIG.
ATT'YS.

CLEANING UNIT FOR COMBINE

BACKGROUND OF THE INVENTION

The present invention relates generally to separating mechanisms and more particularly to an improved cleaning unit for use in a combine type harvester.

Present day harvesting machines generally include three basic assemblies for separating the grain kernels from the remaining material of the mass harvested from the fields. The first assembly which is generally used in a harvesting machine, such as a self-propelled combine, includes a threshing cylinder cooperating with a concave which generally removes the kernels of grain from the remaining harvested mass. This harvested material is then carried rearwardly by some type of conveying structure upon a second separating assembly such as a group of straw walkers or a straw rack. In the second separating assembly, the grain kernels and a large percentage of the loose chaff are separated from the straw by falling through suitable openings provided in the straw walkers or the straw rack. This is generally accomplished by driving the second separating assemblies with an oscillating movement which agitates and moves the mass or mat of threshed material rearwardly.

The grain kernels and chaff that sift through the first and second separating assembly are received on a third or shaker shoe assembly, usually in the form of screens and/or sieves overlying an upwardly directed blast of air emanating from a blower or some other means for producing a blast of air.

This blast is generally caused to pass through a passageway in which the screens or sieves are mounted and thereby lifts the lighter foreign material off the screen or sieves facilitating in separation of the grain from the foreign matter and consequently the passing of the heavier grain through the sieve opening to be collected and transferred to a storage bin.

The blower or fanning mills which to date have been conventionally employed for this purpose have air inlet openings at the sides and are commonly referred to as end-inlet fans. The end-inlet fanning mill has end openings concentric with a rotating shaft carrying blades which produce a centrifugal force that causes the air to be forced out against the casing and be directed through the outlet opening. Thus, there is a resultant reduction of pressure at the center of the casing causing a suction of air through the inlet openings. The momentum of the air results in a larger velocity of air in the middle of the fan outlet than at the ends.

In this type of fanning mill, the resultant air flow out of the unit is highly uneven and there is a considerably larger velocity or output of air near the center of the unit than the output adjacent the ends of the unit. Of course, it is readily apparent that such an unequal distribution of air across the sieves or screens is highly undesirable since the grain in the center of the screen is likely to be blown out of the unit while the side edges of the screens do not receive a sufficient amount of air for proper cleaning.

This highly undesirable distribution of air across the screens of the final cleaning unit is further emphasized in present day combines which are consistently being built in larger sizes to accommodate the demand for higher capacities. Thus, as the width of the harvesting section of a combine is increased, the width of the fanning mill unit must likewise be increased which results in an even greater differential pressure between the center of the outlet and the side edges of the outlet opening of the unit. Furthermore, as the width of the fanning mill unit is increased, the size of the inlet openings or end openings of the unit must likewise be increased to accommodate the additional flow requirements. Thus, as the size of a harvesting unit is increased, the diameter of the fan within the unit must likewise be increased since, theoretically, the inside diameter of the blades of the fan should be at least equal to and preferably greater than the inlet opening of the entire unit.

Another highly undesirable feature of the end-inlet fans conventionally used in harvesting units is that the supporting structure for the shaft carrying the fan blades must be disposed in the path of the air flow in order to properly support the unit for operation. These obstructions will produce a low pressure area which will further result in uneven distribution of air across the outlet opening of the unit. Likewise, the direction in which the wind is blowing, relative to the combine, also affects the efficiency of the unit. For instance, wind blowing into the one fan inlet increases the amount of air delivered through that side of the unit and thus upsets the desired balanced condition across the width of the cleaning unit. Further objection to the conventional type of fanning units is that in present day combines the end inlet openings, due to the nature and construction of the machines, are located directly behind the wheels of a self-propelled unit. This means that all of the dust and other contaminates behind the wheels of the unit are drawn into the final cleaning unit of the harvesting machines which is, of course, highly unsatisfactory.

SUMMARY OF THE INVENTION

Generally speaking, the present invention provides improved apparatus for producing an even distribution of air across the entire width of the outlet opening of a fan unit connected to a passageway having the cleaning screens or sieves mounted therein. This is accomplished by a fan unit having an inlet opening extending the entire length of the fan which is also substantially coextensive in length with the width of the passage forming part of the harvesting unit.

The primary object of the present invention is to provide an improved air separating mechanism for a harvesting unit which has an even distribution of air across the width of the unit regardless of the width of the unit.

Another object is to provide a separating mechanism which includes blower means for producing an even distribution of air across the entire width of the cleaning unit.

A further object of the invention is to provide a blower unit for a combine harvesting mechanism which includes an inlet coextensive with the length of the blowing unit to insure an even distribution of air through the cleaning unit.

Other features and advantages will appear in the following description and appended claims, reference being had to the accompanying drawings forming a part of this specification wherein like reference numerals designate corresponding parts in the several views.

AS SHOWN ON THE DRAWINGS

FIG. 4 is a vertical sectional view of a slightly modified fan unit.

Figure 1:
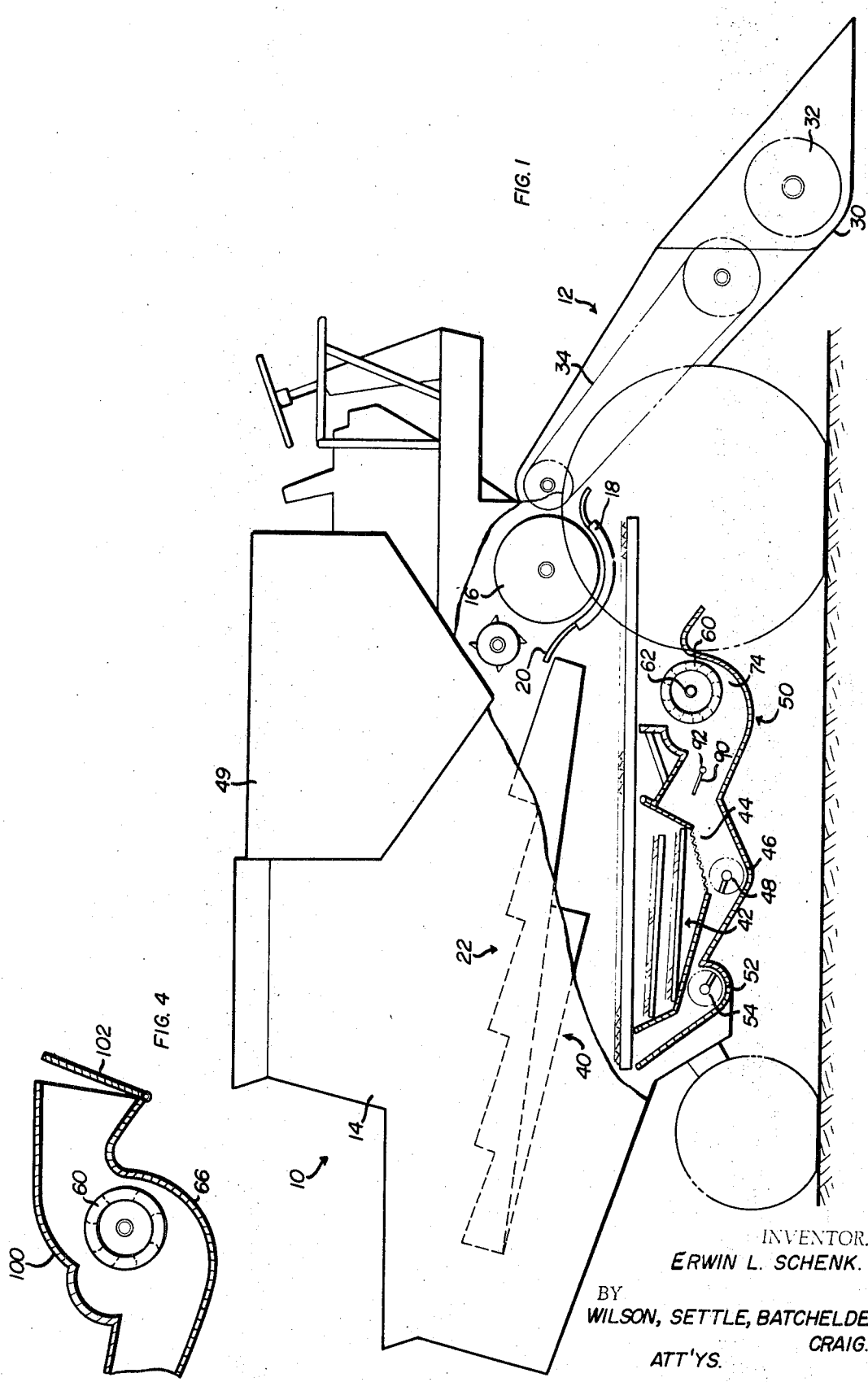
FIG. 1 is a fragmentary side elevation of a conventional harvesting unit incorporating the features of the present invention.

FIG. 1 generally discloses a harvesting unit, such as a combine 10, having a header structure, generally indicated by the reference character 12.

The main harvesting unit or threshing unit generally includes a housing 14 at the forward end of which is journaled, in suitable bearings (not shown), a threshing cylinder 16 of any suitable well known type. A concave 18 is supported in close proximity to the cylinder and has a plurality of fingers 20 constituting a grate directed to a region above a straw rack generally designated at 22.

The header structure 12 is also of conventional construction and includes a cutting mechanism (not shown) and a header (not shown). The header housing or trough, generally indicated at 30, accommodates a conventional transverse auger 32 for delivering harvested material to the feed rake 34 and subsequently between the concave and cylinder.

Thus, harvested material is fed between the concave and threshing cylinder, wherein the grain kernels or seed are removed from the remainder of the harvested material and the remainder of the material is delivered to the straw rack or conventional straw walkers 22. The straw rack is oscillated and agitated to segregate the grain kernels and chaff from the remaining harvested material with the driving means for the straw rack not being shown since these features are conventional and form no part of this invention.

The grain kernels and chaff are received on the grain return pan, generally designated at 40, to be delivered to the cleaning shoe 42 located in a generally elongated passageway 44 defined by the side and bottom walls of the housing 14. The cleaning shoe or screens 42, as well as the return pan 40, are likewise oscillated and vibrated by conventional drive means (not shown).

Air is directed from a blower unit or fanning mill 50, to be described later, to direct a continuous flow of air into and through the passageway 44.

The air directed through the passageway lifts the lighter foreign material, such as chaff, off the screens or sieves and directs it rearwardly to be forced out of the rear end of the machine. The clean kernels are collected in a trough 46 and conveyed by a conventional auger 48 to the storage bin 49. The heads or other large pieces of foreign material received by the cleaning unit are directed rearwardly into another trough 52, forming part of the housing 14, to be delivered by a conventional auger 54 back to the threshing cylinder and concave for repeated processing.

As was indicated above, in order to collect grain kernels, which are completely free of any chaff or other foreign materials and at the same time have a highly efficient machine, it is necessary that an even distribution of air be produced across the entire width of the passageway 44. As is readily apparent, greater flow of air at the central portion of the passageway than at the sides will result in either having too much air flow at the center of the cleaning fan unit or not enough air flow adjacent the sides of the units. In fact, in larger harvesting units both of these conditions may occur simultaneously.

Also, as the size of the harvesting unit is increased, the size of the conventional prior art type fan unit was also necessarily increased. This meant that the height of the entire previously known harvesting unit had to be increased in order to provide sufficient clearance below the housing of the unit and still have a fan unit of sufficient size.

According to the invention, all of the above difficulties and shortcomings of the prior art fan or blower units are eliminated by providing a blower unit which can expeditiously be increased in length without increasing diameter of the unit and the height of the machine. This is accomplished by utilizing a fan unit having an inlet extending across the entire length of the rotor or fan blades to thereby result in an even distribution of flow across the entire length of the outlet of the unit.

Figure 2:
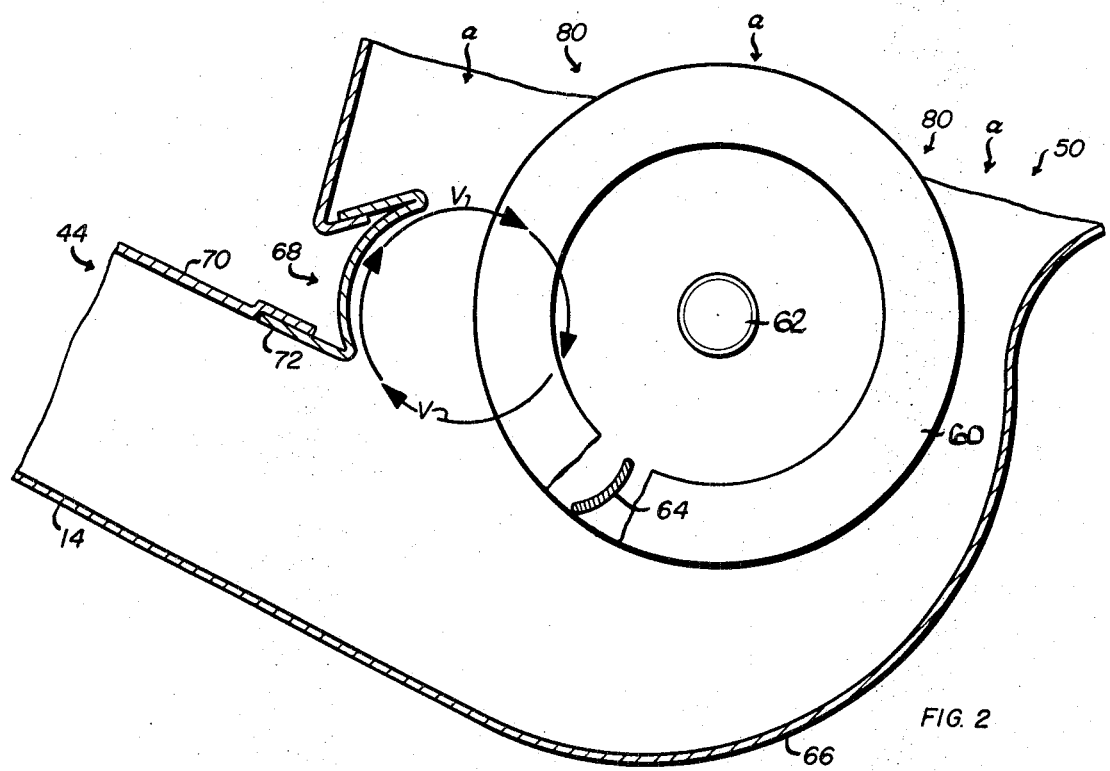
FIG. 2 is an enlarged vertical sectional view of the fan unit shown in FIG. 1.

As shown in FIGS. 1 and 2, the fan unit 50 includes a bladed rotor 60 which is mounted by means (not shown) for rotation about its axis 62. The rotor 60 has arcuately shaped blades 64 thereon that are convex in the direction of rotation of the rotor. Guide wall means 66 extend the entire length of the rotor and merge adjacent one edge with the housing 14 defining the passageway 44. A vortex forming means, generally designated at 68, extends the length of the rotor and has a portion 70 directed away from the rotor to define a second wall of the exit duct generally designated at 72. The exit duct or outlet opening 72 of the blower unit 50 is in open communication with the passageway 44.

End walls 74, only one of which is shown in FIG. 1, cover the ends of the blower unit and substantially close the ends of the rotor. The guide wall means 66 and the vortex forming means 68 define an inlet opening 80.

By properly shaping the vortex forming means 68, a vortex is formed having a core whose periphery is defined by the stream line, indicated by the arrows V. Of course, the character of the vortex is determined by a number of factors such as the blade angle and curvature, the diameter of the rotor, the depth of the blades in a radial direction and the rotational speed of the rotor. Thus, the specific vortex forming means may be designed to meet the particular needs of any given machine. As can readily be understood, the vortex defines a swirling mass of fluid with no translational movement as a whole and thus divides the suction side of the rotor from the pressure side thereof.

In operation, the air is drawn in along lines, generally designated at A, and the drawn air is forced through the rotor blades 64 to the outlet duct 72 into and through the passageway 44. As can readily be appreciated since the length of the inlet opening 80 is increased the same amount as the length of the rotor, the diameter of the rotor need not be increased in order to provide additional flow due to increased width of the passageway 44. Furthermore, by utilizing the cross flow fan unit there will be an equal amount of air drawn in across the entire length of the rotor which will result in an equal distribution of air through the outlet duct 72 and into and through the passageway 44.

If desired, the outlet duct may additionally be provided with a movable plate or member 90 pivoted at 92 adjacent one edge thereof (FIG. 1) to manually direct the flow of fluid through the passageway 44 to suit different crop requirements.

Figure 3:
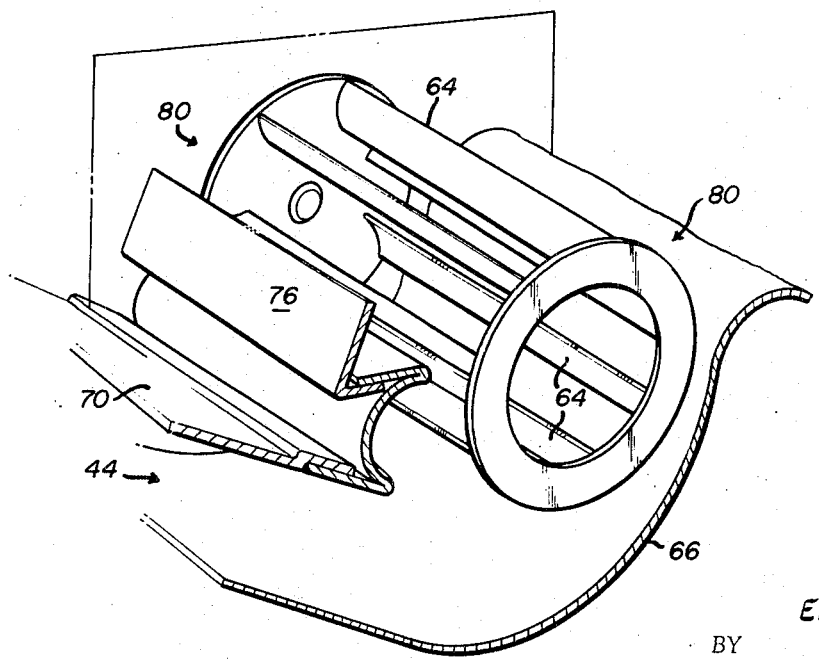
FIG. 3 is a perspective view of the unit shown in FIG. 2.

A slightly modified form of the invention is disclosed in FIG. 4 wherein like numerals are utilized to designate like parts of the embodiment shown in FIGS. 1 through 3. In the modified embodiment, a shrouding or housing wall 100 partially encloses the relatively large inlet air opening and terminates adjacent the free end of the wall guide or lower wall 66 but is spaced a considerable distance therefrom. A valve member 102 is pivotally secured to the free end of the wall guide means 66 and may be of sufficient length so as to entirely close the inlet opening defined by the walls 66 and 100. The upper and lower walls 100 and 66 define an inlet chamber intermediate the inlet opening and the rotor 60. Thus, in this embodiment the amount of air directed through the outlet duct 72 can readily be adjusted by opening or closing the valve or flap 102.

As can readily be appreciated, the invention provides an improved means for creating an even distribution of air across the entire width of the screens or sieves forming the cleaning unit of a conventional harvestor. By utilizing a cross flow fan, the cross-sectional diameter of the entire unit need not be increased in size to accommodate additional air flow therethrough when designing harvester units which are considerably greater in width than has heretofore been known. By utilizing this type of fan unit, the harvesting machines can be built of unlimited width without sacrifice in efficiency of the entire unit or increasing the height of the unit.

Although the present invention has been described in conjunction with preferred embodiments, it is to be understood that modifications and variations may be resorted to without departing from the spirit of the invention as defined by the following claims.

I claim:

1. In a combine harvester for travel through a field and having a longitudinally disposed passage, crop-separating sieve means disposed adjacent said passage in generally overlying relation thereto and means for directing a flow of air through said passage for flow through said seive means; the improvements of said last-named means including a cross flow bladed rotor adjacent said passage and mounted for rotation about its axis, the rotor having the blades concave in the direction of rotation; end walls substantially enclosing the ends of said rotor, guide wall means extending the length of said rotor and forming a side wall of an exit duct facing away from the direction of travel of said harvester and opening fully onto said passage throughout the entire length of said rotor, and an inlet duct facing forwardly in the direction of travel of said harvester and extending substantially the length of said rotor whereby the inlet air is directly received along substantially the length of the rotor, and means forming a vortex between the inlet and exit openings at the rear side of said rotor, said vortex-forming means being longitudinally coextensive with said rotor, and the fore-and-aft orientation of said inlet and said outlet eliminating any cross currents due to ambient winds.